United States Patent [19]

Kunitomo et al.

[11] 3,949,021

[45] Apr. 6, 1976

[54] CROSS-LINKED N-VINYL PYRROLIDONE POLYMER COMPOSITION SUITABLE FOR CONTACT LENSES

[75] Inventors: Tetsunosuke Kunitomo, Kamakura; Hideki Kenjo, Yokohama; Syoji Nagaoka, Kamakura; Takeshi Yoshioka, Kamakura; Hiroshi Tanzawa, Kamakura, all of Japan

[73] Assignee: Tor'ay Industries, Inc., Tokyo, Japan

[22] Filed: Aug. 7, 1974

[21] Appl. No.: 495,529

[30] Foreign Application Priority Data

Aug. 13, 1973 Japan................................ 48-90005

[52] U.S. Cl................ 260/895; 260/17 A; 351/160
[51] Int. Cl.$^2$...................... C08L 1/28; C08L 39/06
[58] Field of Search. 260/17 A, 885, 895, 29.6 WB; 351/160

[56] References Cited
UNITED STATES PATENTS

| | | | |
|---|---|---|---|
| 3,728,317 | 4/1973 | Blank | 260/89.5 A |
| 3,767,731 | 10/1973 | Seiderman | 260/885 |
| 3,792,028 | 2/1974 | Seiderman | 260/80.72 |

*Primary Examiner*—Harold D. Anderson
*Assistant Examiner*—Edward Woodberry

[57] ABSTRACT

Contact lens having high water content make from polymer of cross-link-polymerized N-vinyl pyrrolidone in the presence of water-insoluble polymer has excellent properties suitable for continuous wearing for a long period of time.

4 Claims, No Drawings

CROSS-LINKED N-VINYL PYRROLIDONE POLYMER COMPOSITION SUITABLE FOR CONTACT LENSES

This invention relates to a polymer composition suitable for use in contact lenses and wearable continuously for a long period of time. Especially, this invention relates to a novel "soft contact lens" having high water content and excellent mechanical strength, permeability of water and oxygen, optical properties, and ease of sterilization.

Contact lenses have conventionally been fabricated of relatively hard plastics. The hardness of these plastics has caused problems in the use of contact lenses because it has required a "breaking in" period varying in length of time with the particular individual. Attempts to make softer contact lenses (so-called soft contact lenses) have not been entirely satisfactory.

One of the known typical soft contact lenses is a hydrophilic contact lens made mainly from a cross-linked polymer of 2-hydroxyethyl methacrylate (HEMA). However, known soft contact lenses have had problems in mechanical strength, optical properties, permeability with respect to some substances such as water and oxygen, and sterilization. Especially, it has been quite difficult to maintain both high water content and mechanical strength. This invention provides a novel polymer composition ideally adaptable for use in contact lenses.

In accordance with this invention, a polymer composition is made by cross-link polymerizing (that is, simultaneous polymerizing and cross-linking) N-vinyl-2-pyrrolidone in the presence of a water-insoluble linear polymer dissolved in vinyl monomer.

The polymer composition of this invention has a special structure in which the water-insoluble linear polymer exists without macroscopic phase-separation, in a state of dispersion less than the wave length of visible light in the cross-link polymerized N-vinyl pyrrolidone, and maintains high transparency, excellent physical durability and permeability of water and oxygen even in the hydrophilic state.

The water-insoluble linear polymer is usually selected from insoluble polymers having a tensile strength of at least about $2.5 \times 10^3$ psi in water, a transmissivity of visible radiation of at least about 80% and a molecular weight of at least about 10,000.

Examples of preferable water-insoluble polymers are vinyl type polymers such as polystyrene, polymethyl methacrylate, polyvinylacetate, polyvinylchloride, polyvinylidene dichloride, polymethacrylonitrile, copolymer of styrene-butadiene, copolymer of styrene-acrylonitrile, copolymer of vinyl chloride-vinylidene dichloride, copolymer of vinyl chloridevinyl isobutylether, copolymer of vinylidene dichloride-acrylonitrile, copolymer of vinyl chloride-methyl methacrylate, copolymer of vinyl chloride-vinyl acetate, polyvinylbutyral, polyvinylformal, copolymer of ethylene vinyl acetate and copolymer of ethylene-ethyl acrylate, condensed polymers such sa polyamides, polyesters, polycarbonate and polyurethane, and cellulose type polymers such as nitrocellulose, ethyl cellulose, cellulose-acetate and cellulose-acetate-propionate. The ratio of N-vinyl pyrrolidone to the water-insoluble polymer is preferably about 98/2 to 50/50 by weight.

The cross-link polymerization is conducted under the usual conditions of general cross-link polymerizations. That is, N-vinyl pyrrolidone is polymerized in the presence of a water-insoluble polymer dissolved therein, and of a cross-linking agent.

As is well known, the cross-linking agent is preferably selected from compounds having at least two polymerizable unsaturated bonds in their own molecules.

Examples of preferable cross-linking agents are di- or tri-allyl compounds such as diallyl succinate, diallyl phthalate, diallyl maleate, diethyleneglycolbisallyl carbonate, triallyl cyanurate, triallyl isocyanurate, triallyl phosphate, triallyl trimelitate, di- or tri-vinyl compounds such as divinyl benzene, N, N'-methylene bisacrylamide, ethyleneglycol diacrylate, ethyleneglycol dimethacrylate, diethyleneglycol dimethacrylate, hexamethylene bismaleimide, divinyl urea, bisphenol A bismethacrylate, divinyl adipate, glycerine trimethacrylate, trimethylolpropane triacrylate, trivinyl trimelitate, 15-pentadiene, and allyl vinyl compounds such as allyl acrylate, allylmethacrylate.

The cross-linking agent is preferably used in the range of about 0.005 to 20 mole % of the N-vinyl pyrrolidone.

The cross-linking polymerization is preferably initiated by a free radical catalyst.

In this case, as is well known, the free radical catalyst is decomposed by heat, ultraviolet rays or radiation to initiate polymerization.

Examples of preferable free radical catalysts are organic peroxides such as di-tert-butyl peroxide, benzoyl peroxide, 2, 4-dichlorobenzoyl peroxide, t-butyl hydroperoxide, peracid, ammonium persulfate, azocompounds such as axobisisobutylonitrile, azobiscyclohexanecarbonitrile, phenyl azoisobutylonitrile, azobisvaleronitrile and redox catalyst.

The free radical catalyst is preferably used in the range of about 0.001 to 3 mol % of the polymerizable monomer.

The cross-link polymerization is carried out under normal polymerization temperatures, suitably about 15° to 80° C.

The initial stage of polymerization is preferably conducted at a somewhat low temperature.

After polymerization, the produced polymer composition can be post cured at a higher temperature of about 80° C to about 110° C.

The cross-link polymerization is conducted by the bulk polymerization method, in which case a normal organic solvent such as hydrocarbon, halogenated hydrocarbon, alcohol, ketone, carboxylic acid, ester, glycol, ether, acetal, sulfoxide, amide, amine, nitrile or nitro compound can be used less than about 20% by weight.

In this invention, a monovinyl monomer other than N-vinyl pyrrolidone can be used jointly with N-vinyl pyrrolidone in the range of less than about 40 mole % preferably less than about 10 mole % of the N-vinyl pyrrolidone.

Examples of preferable mono vinyl monomers are N-vinyl lactams such as N-vinyl caprolactam, acrylic compounds such as acrylamide, dimethyl acrylamide, diethyl acrylamide, N-propyloxymethyl acrylamide, dimethyl methacrylamide, acrylic acid, methacrylic acid, 2-hydroxyethyl methacrylate, methyl methacrylate, n-butyl acrylate, acrylonitrile and methacrylonitrile, vinyl esters such as vinyl acetate, aromatic olefins such as styrene, vinyl ethers such as vinyl methyl ether, vinyl amines such as vinyl pyridine, vinyl sulfonic monomers such as vinyl sulfonic acid, styrene sulfonic acid, allylic compounds such as allyl acetate, unsaturated acid anhydrides such as maleic anhydride, and unsaturated halogenic compounds such as vinyl chloride.

In this invention, a photosensitizer such as acetophenone, carbazole or benzoin can be used together with the free radical catalyst.

In this invention in which the water-insoluble linear polymer is dissolved in liquid vinyl monomer consisting essentially of N-vinyl pyrrolidone and then the polymerizable component in the liquid composition is cross-link polymerized, the volumetric shrinkage during polymerization is quite small.

Accordingly, the cross-link polymerization may be preferably conducted by cast polymerization using a mold having a suitable curvature. The resulting shaped polymer composition may be immersed in water to give the hydrogel contact lens.

It is, of course, feasible to process a bulk product of the polymer composition by cutting or machining into the final desired shape.

It is preferred to machine the outer edges of the lens to a tapered shape so that it is more compatible with the eyeball and to permit the lens to retain its position on the cornea without being displaced by movements of the eyelids.

The product is a clear transparent gel which swells in water to contain at least about 60%, preferably about 65 to 90% of water.

The contact lens with a water content of at least about 60% in accordance with this invention has excellent mechanical strength which is maintained for a long time, it is quite easily sterilized, it has excellent optical properties including clarity and structural integrity and surface characteristics and freedom from distortion and, especially, it has a high resolving power and does not change its optical characteristics on the eye. Further, it has excellent permeability with respect to water and oxygen.

The following examples serve to illustrate this invention.

EXAMPLE 1

A clear and homogeneous solution was obtained by heating the following mixture at 60° C with stirring: 2.5 parts of isotactic poly (methyl methacrylate) ($[\eta]^{*1}=0.9$, $I^{*2}=90\%$) prepared by anionic polymerization with phenylmagnesium bromide, 12.5 parts of syndiotactic poly (methyl methacrylate) prepared with azobisisobutylonitrile ($[\eta]=0.4$, $S^{*2}=45\%$), 85 parts of N-vinyl-2-pyrrolidone, 2 parts of dimethylsulfoxide, 0.5 part of diallylsuccinate and 0.03 part of azobiscyclohexanecarbonitrile. Then the solution was polymerized in a glass vessel by irradiating with a high pressure mercury lamp (450 W) at 10° C.

Four hours later, the vessel was transferred into an air oven (90° C) and heat-cured for 24 hours. The block thus obtained was then fabricated to the shape of a lens with a curved lathe and a polishing machine.

The swollen lens had a 74.9% water content, 275 psi tensile strength and a $1.7 \times 10^{-12}$ g/cm².sec. oxygen permeability coefficient.

This lens had excellent visual acuity, was clear, suitable for continuous wearing for a week only by washing twice in water, and comfortable to wear.

Further, both the optical and mechanical properties of this lens were stable during wearing.

*1. $[\eta]$ was the intrinsic viscosity measured in chloroform solution at 25° C. *2. I or S was the percentage of stereoregularity (isotactic or syndiotactic) indicated by triads.

EXAMPLE 2

A solution of 20 parts of syndiotactic poly (methyl methacrylate) used in Example 1, 80 parts of N-vinyl-2-pyrrolidone, 0.5 part of butenetricarboxylic acid triallyl ester, and 0.03 part of azolisisobutylonitrile was poured into a convex glass mold with a curvature of 4.5 mm radius, and polymerized by heating. The polymerization condition was as follows: 50° C/3 hours, then 60° C/6 hours and further 90° C/12 hours. The surface of the moulding thus obtained was cut into convex form, polished and edge-finished to form a lens.

The lens thus obtained had a 75.1% water content, a $2.9 \times 10^{-12}$ g/cm².sec. oxygen permeability coefficient, and was suitable for continuous wear for some weeks.

EXAMPLE 3

A solution of 1 part of poly (methyl methacrylate), 1 part of methyl methacrylate, 7 parts of N-vinyl-2-pyrrolidone, 1 part of N-vinylpiperidone, 0.1 part of allylmethacrylate, and 0.006 part of azobisisobutyronitrile was polymerized by heating. The polymerization condition was as follows: 55° C/1 hour, then 60° C/12 hours, and further 90° C/24 hours.

The molding thus obtained was fabricated to the shape of a lens as in Example 1.

The water content of this lens was 78% and its oxygen permeability coefficient was $2.6 \times 10^{-12}$ g/cm.sec.

EXAMPLE 4

A solution of 20 parts of cellulose acetate (with a molecular weight of 36,000), 90% of the permeability rate of visible light and 39.8% of the degree of acetylation) 80 parts of N-vinyl-2-pyrrolidone, 0.1 part of diallylmaleate, 0.005 part of benzoin ethyl ether and 0.005 part of azobisdimethyl valeronitrile was poured into a vessel containing a steel ball, and polymerized and fabricated in the shape of a lens as in Example 2, in this case the concavity of the mold was formed by the surface of the steel ball.

The lens thus obtained had a 79% water content, a 200 psi tensile strength and a $3.5 \times 10^{-12}$ g/cm². sec. oxygen permeability coefficient.

The lens was worn on rabbit eyes for more than 150 days without any discomfort or difficulty.

CONTROL 1

A lens made of cross-linked poly (hydroxyethyl methacrylate), with 38% water content and $0.46 \times 10^{-12}$ g/cm². sec. of oxygen permeability coefficient, could not be kept on rabbit eyes for more than 1 day because of drying of the lens surface.

EXAMPLES 5–7

Various lenses shown in Table 1 were made in the same way as Example 1.

These lenses were suitable for long range continuous wearing, and were comfortable.

Table 1

| Example | Added water-insoluble polymer and its content (part) | | Monomer and its content (part) | | | Properties of the lens | |
|---|---|---|---|---|---|---|---|
| | | | N-vinyl-2-pyrrolidone | n-butylacrylate | HEMA | Water content (%) | Tensile strength (psi) |
| 5 | polyurethane (poly ether type) | 20 | 75 | | 5 | 74.3 | 103 |
| 6 | poly (vinyl chloride) | 15 | 80 | 3 | 2 | 78.5 | 235 |
| 7 | high impact-polystyrene | 17 | 80 | | 3 | 82.0 | 175 |

The following is claimed:

1. A cross-linked N-vinyl pyrrolidone polymer composition suitable for use in contact lenses, which composition has capacity to absorb at least about 60% by weight of water, comprising a polymer of a vinyl monomer consisting essentially of N-vinyl pyrrolidone cross-link polymerized in the presence of water-insoluble polymer dissolved therein and a cross-linking agent having at least two polymerizable unsaturated bonds in its molecule.

2. Polymer composition of claim 1, in which the ratio of vinyl monomer consisting essentially of N-vinyl pyrrolidone to water-insoluble polymer is about 98/2 to 50/50 by weight.

3. Contact lens having capacity to absorb at least about 60% by weight of water, suitable for continuous wearing for protracted periods, made from the polymer composition of claim 1.

4. Polymer composition of claim 1, in which the water-insoluble polymer is polymethyl methacrylate.

* * * * *